United States Patent
Kennedy, Jr. et al.

(10) Patent No.: US 7,483,703 B2
(45) Date of Patent: Jan. 27, 2009

(54) INDEPENDENTLY ACQUIRING AND TRACKING WIRELESS COMMUNICATION SYSTEM SIGNALLING CHANNEL ASSIGNMENTS ON COMMUNICATION LINKS

(75) Inventors: Joseph P. Kennedy, Jr., Great Falls, VA (US); Thomas Booker Gravely, Herndon, VA (US); Robert Brickhouse, Reston, VA (US); Dennis Bergin, Vienna, VA (US)

(73) Assignee: Andrew LLC, Hickory, NC (US)

( * ) Notice: Subject to any disclaimer, the term of this patent is extended or adjusted under 35 U.S.C. 154(b) by 164 days.

(21) Appl. No.: 10/547,524

(22) PCT Filed: Mar. 3, 2004

(86) PCT No.: PCT/US2004/006179

§ 371 (c)(1),
(2), (4) Date: Jun. 14, 2006

(87) PCT Pub. No.: WO2004/080091

PCT Pub. Date: Sep. 16, 2004

(65) Prior Publication Data

US 2006/0240836 A1 Oct. 26, 2006

Related U.S. Application Data

(60) Provisional application No. 60/450,704, filed on Mar. 3, 2003.

(51) Int. Cl.
*H04Q 7/20* (2006.01)
(52) U.S. Cl. ............... 455/450; 455/452.1; 455/515
(58) Field of Classification Search .......... 455/403, 455/414.1, 426.1, 432.1, 436, 438, 439, 447, 455/423, 67.11, 410, 411, 405, 435.1, 450, 455/451, 452.1, 455, 464, 515, 516, 562.1, 455/445; 370/329, 341, 344, 437, 328
See application file for complete search history.

(56) References Cited

U.S. PATENT DOCUMENTS

| 4,955,054 | A | * | 9/1990 | Boyd et al. | 379/269 |
| 5,682,416 | A | * | 10/1997 | Schmidt et al. | 455/436 |
| 6,088,587 | A | * | 7/2000 | Abbadessa | 455/424 |
| 6,330,449 | B1 | * | 12/2001 | Kim | 455/442 |
| 7,167,713 | B2 | * | 1/2007 | Anderson | 455/456.1 |

FOREIGN PATENT DOCUMENTS

| EP | 0 851 700 A1 | 1/1998 |
| EP | 0 920 228 A1 | 2/1999 |
| EP | 1 096 821 A2 | 2/2001 |

* cited by examiner

*Primary Examiner*—Jean A Gelin
(74) *Attorney, Agent, or Firm*—Duane Morris LLP

(57) ABSTRACT

A system for monitoring each channel of the communication link (307) for protocol messages and identifying a set of channels with valid protocol messages and, monitoring the set of channels to determine the transceivers (309) served by the set of channels and associating the transciver (309) with respective channels from the set of channels.

45 Claims, 3 Drawing Sheets

INDEPENDENTLY ACQUIRING AND TRACKING WIRELESS COMMUNICATION SYSTEM SIGNALLING CHANNEL ASSIGNMENTS ON COMMUNICATION LINKS

CROSS REFERENCES

The present application is co-pending with and claims priority benefit of provisional application entitled "Independently acquiring and tracking wireless mobile telephone system signaling channel assignments on communication links," Application Ser. No. 60/450,704 and filed on Mar. 3, 2003, the entirety of which is incorporated herein by reference.

BACKGROUND

The subject matter of the present disclosure is directed to acquiring specific channel information from certain communication systems. The subject matter disclosed allows this information to be gained independently without coordination or cooperation from the mobile communication system.

There are many applications for this method and associated apparatus, for brevity and clarity, the method is described in relation to a communications network, particularly a wireless mobile telephone communication system. Wireless communication systems for mobile telephones have been extensively described in public references FIG. 1 is an illustration of a typical wireless communication system 100. The system has a series of base stations or base station transceivers (BTS) 120a-c controlled by a base station controller (BSC) 110. The BTS 120 communicates over one or more allocated channels with a mobile appliance 150, mobile phone or other type of mobile device such as a computer.

Referring to the FIG. 1, in the case of typical wireless communication networks, the BTS 120 and BSC 110 nodes are not physically co-located, and the information that flows between them is passed on a digital communications facility (communication link) 130a-c such as a T1 or T3 span. Signaling channels as well as voice channels are contained in the T spans. If an auxiliary system (AXS) piggybacked to the system is probing or monitoring the signaling channels to acquire channel assignment information on the T spans, the monitors of the auxiliary system must know where on the T spans the signaling channel resides in the mix of voice or other data channels. For example, in the case of a T1, there are 24 channels, designated Digital Signaling level "0" (DSO)s, that could contain the signaling information. (Digital Signaling level 0 is the worldwide standard speed for digitizing one voice conversation using pulse code modulation (PCM) and sampling the voice 8,000 times a second and encoding the result in an 8-bit code)

One such system as shown in FIG. 2, places Auxiliary Receivers (AXR) 160 at base station sites, an Auxiliary Control System (ACS) 170 at the mobile switch site (MSC) 140, and an Abis Monitoring Unit (AMU) 180 at the base station controller on the communication link 130 between the BTS 120 and the BSC 110.

In one mode of operation of the wireless system, the Radio Frequency (RF) transmission from a mobile of interest 150 (the mobile in which there is an interest in obtaining its transmission signal) is on a specifically assigned channel. A channel in the context of this disclosure can refer to an RF frequency, time slot, message assignment, hopping sequence, encryption key, etc. Knowing the channel assignment for the mobile of interest allows the AXR 160 units to receive the RF energy uniquely from this mobile appliance for use in quality measurements, detection, interception and exploitation of the communication or other auxiliary use of the mobile's transmitted signal. In some instances, the channel assignment information is provided cooperatively to the auxiliary system (AXS) 190 from the host wireless system 100 or network.

In other cases, the channel assignment information must be learned by monitoring or probing certain interfaces in the mobile telephone system 100, such as for detection intercepting and exploiting the communication where cooperation is not expected or in the case where the wireless communication system 100 is overburdened or not equipped to provide such information.

These interfaces where channel assignment information resides are generally called signaling channels. In FIG. 2, the AMU 180 is monitoring the signaling channels between the BTS 120 and the BSC 110 to learn the channel assignments for the mobile of interest 150.

One method to provide this information would be for an AMU 180 to be configured with a table that assigned channels in T spans to signaling channels from specific BTS sites. However, this method becomes ineffective if the signaling channel assignment to a T span channel is dynamic. With the advent of smart antennas and dynamic networks, this is the case for many installations of mobile wireless communication systems.

In the alternative, the channel assignment information must be learned by monitoring or probing certain interfaces in the mobile wireless system to which the subject matter of this disclosure is generally drawn. These interfaces where channel assignment information resides are generally called signaling channels.

Therefore in order to obviate the deficiencies of the prior art, it is an object of the present disclosure to provide a novel method for acquiring channel assignment information by monitoring the communication link 130 between a BSC 110 and a BTS 120.

It is also an object of the present disclosure to present in a communication system a method to acquire signaling information (channel assignment or traffic information) from the communication link with a link tap. The method including monitoring each channel of the communication link for protocol messages and identifying a set of channels with valid protocol messages and, monitoring the set of channels to determine the transceivers served by the set of channels and associating the transceivers with respective channels from the set of channels. The novel method also includes monitoring messages of each of the channels associated with the transceivers to determine broadcast channels assigned to the transceiver. The method further includes mapping the broadcast channels to a network device, and monitoring the broadcast channels with a receiver to determine a parameter value for the broadcast channel.

It is still an object of the present disclosure to present in a communication network having a base transceiver station and a base station controller operably connected by a communication link with a plurality of channels, a novel method for obtaining traffic information independently without cooperation from the communication system. The method includes dynamically monitoring the communication link for signaling channels with a link tap and mapping channel connections with information, such as channel assignment, obtained from the signaling channels.

It is another object of the present disclosure to present a novel method of dynamically acquiring channel assignments by monitoring signaling channels between network entities connected by a communication link. The method including determining channel data rate; selecting channels in the communication link used for Abis signaling and forming a set of selected channels; monitoring the set of selected channels to detect a known subset of network entities and associating the set of selected channels with the subset of network entities. The novel method also includes monitoring the associated channels for each network entity for broadcast channel values associated with each network entity.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

Figure 1:
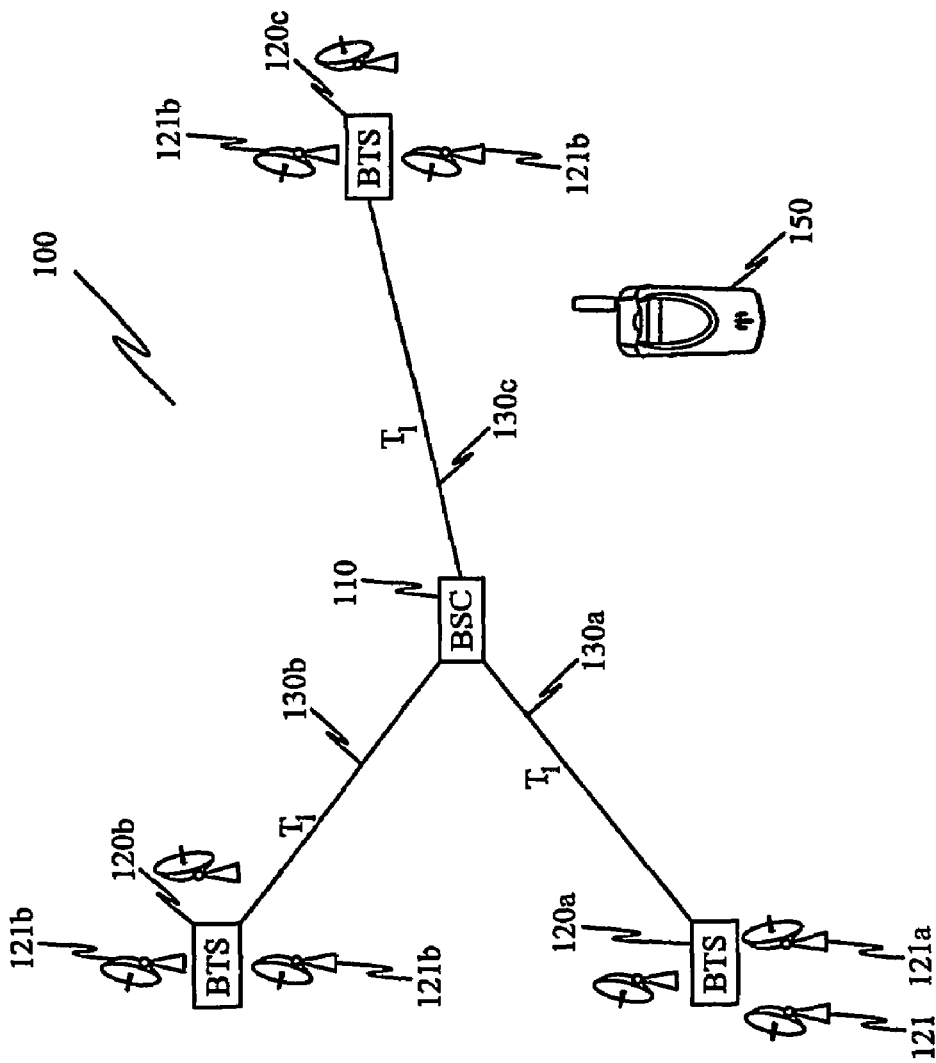
FIG. 1 is a representation of a wireless communication system.
Figure 2:
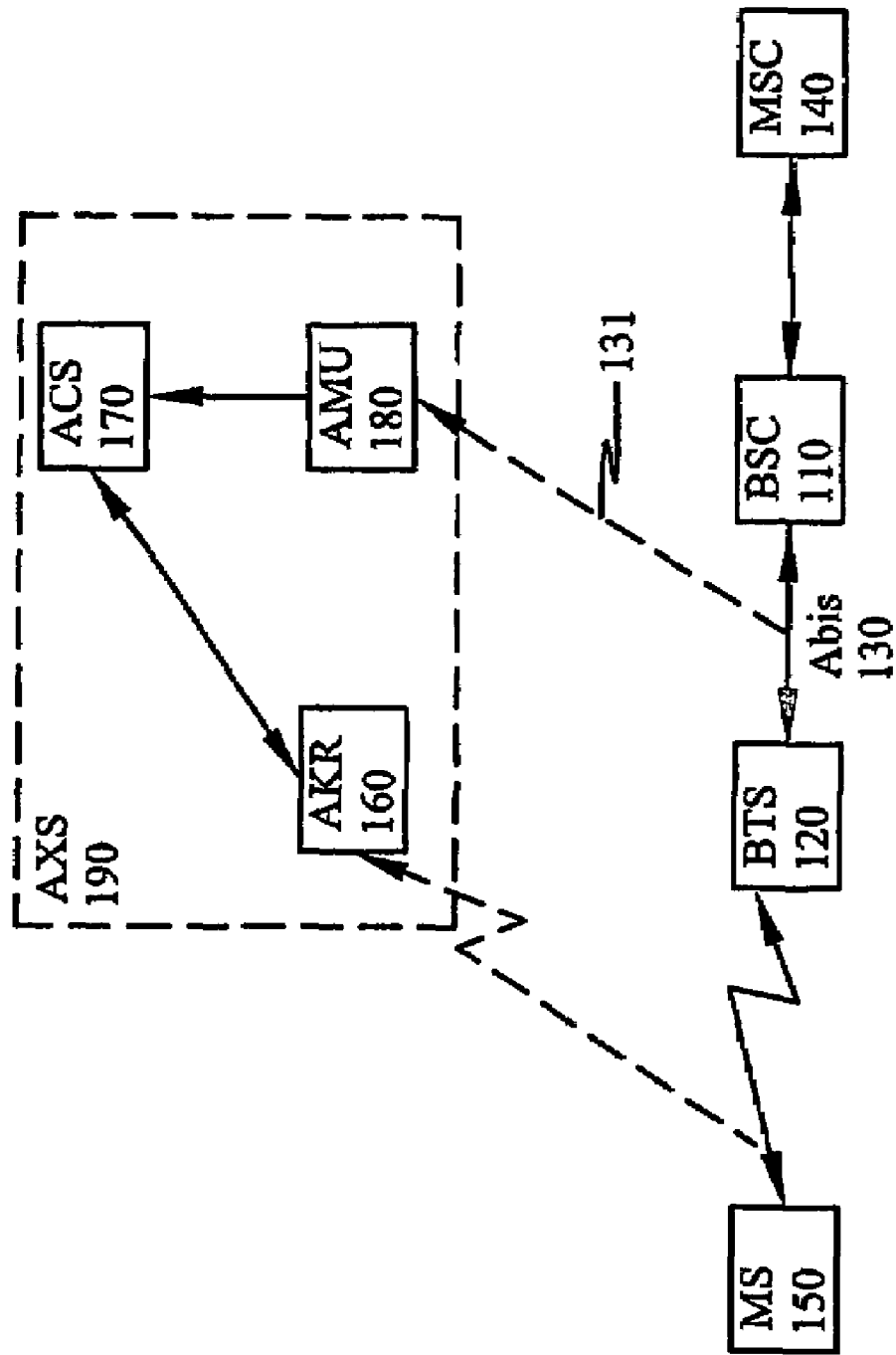
FIG. 2 is a representation of a wireless communication system with an auxiliary system.
Figure 3:
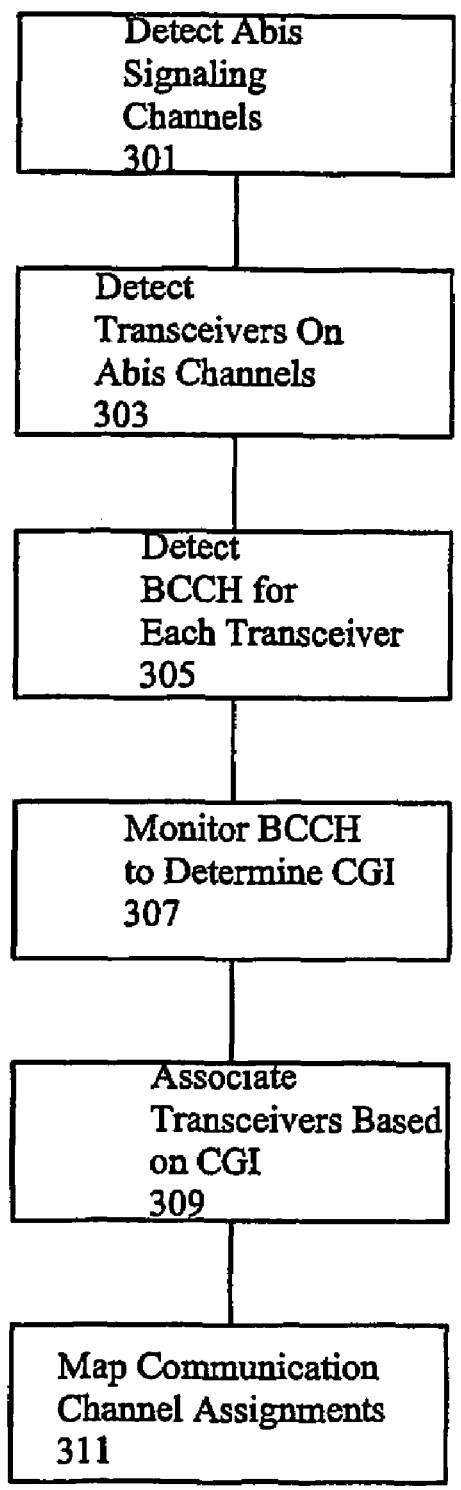
FIG. 3 is a representation of a method for acquiring signaling information from a communication link according to an embodiment of the disclosed subject matter.

Embodiments of the subject matter are described in relationship to FIG. 2 and FIG. 3. FIG. 2, as shown, uses the Global System for Mobile communication (GSM) air standard as an example, but this disclosure is applicable to any system where the channel assignment information contained in messaging between network entities.

The disclosed subject matter provides a means to acquire and track the signaling channels on the communications facilities. The disclosure describes the subject matter in terms of GSM Abis Transceiver (TRX) signaling channels on T1/T3 digital communication facilities, but the approach could apply to other air interfaces and communications facility types such as Optical Carriers i.e., OC-3.

Throughout this disclosure, names for data fields, messages, network entities, etc, are taken from the public document produced by the 3GPP partnership designation TS 08.58, predominately from sections 8.3 and 8.4, which are incorporated herein by reference.

The method and apparatus to acquire assignment information is resident in the AMU 180, ACS 170 and AXR 160 as referenced in the FIG. 2 above. In FIG. 2, the AMU 180 monitors the signaling channels between the BTS 120 and the BSC 110 to learn the channel assignments for the mobile of interest 150 by mapping the T span. All T spans (both directions) used to communicate between the BSC 110 and the BTS 120 are accessible by the AMU 180 by a link tap 131, and the AMU 180 knows which T span is providing communications to each of the BTS 120. The AMU 180 also knows the number of transceivers 121 at a BTS 120 (this affects the number of signaling channels), and the method of signal allocation (e.g., Link Access Protocol-D (LAPD) concentration) for each signaling channel. The subject matter disclosed herein supports many Abis signal allocations including: Unconcentrated (UNCONC), LAPD Concentration (CONC), 16 kb multiplex (MPLEX16), 32 kb multiplex (MPLEX32). For the purposes of this description, the T span interface will be assumed to be a T1 for clarity.

An embodiment of the disclosed subject matter performs the following operations on all T1 interface pairs connected to the AMU 180 in order to obtain assignment information. The T1 interface pairs include a T1 interface from the BSC 110 to the BTS, and a T1 interface from the BTS 120 to the BSC 110, both forming a communication link 130 between the BSC 110 and the BTS 120. The disclosed subject matter detects Abis signaling channels, transceivers, as well as Broadcast Channel (BCCH) and Common Gateway Identifier (CGI) values assigned to each transceiver, and optionally associates transceivers based on the GCI to acquire an initial channel assignment for the T span.

Abis Signaling Channel Detection

The purpose of Abis signaling channel detection is to determine which DSOs (or DSO sub channels) on a T1 pair are transferring Abis signaling data. The signaling channel data rate is determined based on the signal allocation method used for a given T1 pair. UNCONC and CONC allocation methods use 64 kb channels (full DSOs), while MPLEX 16 uses 16 kb sub channels (4 per DSO), and MPLEX32 uses 32 kb sub channels (2 per DSO). Once the signaling channel data rate is determined, each channel or sub channel on a T1 pair is monitored by the AMU 180 for valid LAPD messages. The presence of valid LAPD messages indicates that a channel is used for Abis signaling. A LAPD message is considered valid if it has a valid Cycle Redundancy Check (CRC) value. The AMU 180 determines that a T1 channel/sub channel contains Abis signaling if a configurable number of consecutive LAPD frames are received in a configurable time period. The configurable number of consecutive LAPD frames and configurable time period can be predetermined by the AXS 190 operator, automatically adapted by the AXS 190 or fixed. Both T1 lines in a T1 pair are monitored for valid LAPD messages in order to speed up the detection process.

Transceiver Detection

The purpose of transceiver detection is to detect all of the transceivers that use the Abis signaling channels detected during the Abis Signaling Channel detection. The detected Abis signaling channels form a set of signaling channels (or selected channels). Transceivers are uniquely identified on a T1 by the fact that they send and receive LAPD messages with a unique Terminal Endpoint Identifier (TEI) field. Transceiver detection is performed by monitoring each of the signaling channels in the set for a configurable number of consecutive LAPD messages whose Service Access Point Identifier (SAPI) value is 0 and whose TEI value is constant. This monitoring is also performed over a configurable time period. In the case of the CONC signaling allocation method, multiple transceivers are detected on the same signaling link, thus the detection of multiple repeated TEIs will result in transceiver detection. Transceiver detection is complete once the number of detected transceivers matches the known number of transceivers assigned to the T1 pair or until a reasonable time period elapses. The reasonable time period is simple a run time error that can be set by the AXS 190 operator or otherwise adapted or fixed. Upon completion of transceiver detection, each detected signaling channel is mapped to a transceiver or set of transceivers as in the case of CONC signaling.

BCCH Detection

The purpose of Broadcast Channel detection is to determine the BCCH channel values assigned to a BTS 120. BCCH detection is performed by monitoring the messages passed between the BSC 110 and each of the transceivers detected in the transceiver detection. The BCCH channel number is a field in the Cell Channel Description information element (IE). This IE can be found in an assignment message such as the ASSIGNMENT COMMAND message (as defined in 8.58) sent from the BSC 110 to the respective transceiver. As ASSIGNMENT COMMAND messages are detected, the BCCH values are extracted and saved in a memory device, such as a database or lookup table. BCCH detection continues until the number of detected BCCHs matches the known number of sectors for the given BTS 120, or until a configurable timer expires (run time error). After conclusion of BCCH detection, the BCCH assigned to each transceiver detected are known.

CGI Detection

The purpose of Common Gateway Interface CGI detection is to associate a CG1 value with each of the BCCHs detected. CGI detection is performed by passing the BCCH values detected on a T1 pair to the AXR 160 that serves the BTS 120 that is connected to that T1 pair. A table resident in the AXS 190, such as a look up table, maps BTS 120 T1 pairs to AXRs. Once the AXR 160 receives the BCCH values, it synchronizes to each BCCH by decoding the Sync channel from the actual broadcast channel as received at the AXR 160. Once this is done, the BCCH logical channel is monitored for information messages such as SYStem INFOrmation 3 messages. This message contains the CGI value for the BCCH. This step is complete once this procedure is performed for all BCCH values detected on a T1 pair. The operation of CGI detection can also be restrained by a run time error set by the AXS operator, or otherwise adapted or fixed.

Transceiver Association

The purpose of transceiver association is to group all transceivers with the same CGI (i.e. transceivers of the same sector) together. This operation becomes necessary so that call setups on one transceiver but activated on another transceiver can be correctly tracked. Transceiver association is accomplished by monitoring all transceivers detected for channel assignments as well as channel activations. Whenever a channel assignment and channel activation are detected that have a matching encryption key, it can be determined that the two transceivers are associated with the same CGI and can be grouped together. This step is complete once all transceivers detected have been placed in a group or until a configurable timer expires. Transceiver association is a refining function applicable to some possible applications but not for all application which require acquiring channel assignment information.

These operations provide a means to initially establish the communications link assignment for the signaling channels. If it is determined that the signaling channels have been reassigned, or alternatively periodically, the acquisition process can be repeated to reacquire the assignment for individual or groups of signaling channels.

FIG. 3 is an illustrative flow chart of the above described operation for acquiring channel assignment information from the communication link 130 between the BSC 110 and the BTS 120 according to an embodiment of the disclosed subject matter. In FIG. 3, the AMU 180 monitors the communication link for Abis signaling channels as shown in block 301. The set of Abis signaling channels are then monitored to detected the transceivers using the Abis signaling channels as shown in block 303, this step is repeated until all the known transceivers are detected or a time run error occurs. For each transceiver the respective Abis signaling channel is monitored to determine the BCCHs assigned to the transceiver as shown in block 305. The AXR 160 then monitors the assigned broadcast channels to determine a CGI value as shown in Block 307. The method then associates transceivers with common CGI together as shown in Block 309. The embodiment shown in FIG. 3 stores the information acquired from the communication link as a map of the communication channel assignments for the particular communication link as shown in Block 311.

While the operations in the flow chart of FIG. 3 are shown as being performed in series, it is also envisioned that several operations can be preformed in parallel, limited only by the functionalities of the AMU 180.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

The invention claimed is:

1. In a communication system where a base transceiver station and a base station controller are operably connected by a communication link having a plurality of communication channels, a method for determining communication channel assignment comprising the steps of:
    monitoring each communication channel of the communication link for protocol messages and identifying a set of channels with valid protocol messages;
    monitoring the set of channels to determine transceivers served by the set of channels and associating the transceivers with respective channels from the set of channels;
    monitoring messages of each of the respective channels associated with each transceiver to determine broadcast channels assigned to the transceiver; and,
    mapping the broadcast channels to a network device, and monitoring the broadcast channels to determine a parameter value for the broadcast channel.

2. The method of claim 1 wherein the step of monitoring each communication channel includes determining whether the communication channels contain protocol messages and if the protocol messages have consecutive valid values over a predetermined period of time.

3. The method of claim 2 wherein the protocol messages are Link Access Protocol-D (LAPD) messages.

4. The method of claim 1 wherein the step of monitoring the set of channels includes the step of monitoring the set of channels for a unique value in a predetermined field over a predetermined period.

5. The method of claim 4 wherein the unique field is a Terminal Endpoint Identifier (TEI) field.

6. The method of claim 1 wherein the step of monitoring messages of each of the respective channels to determine a broadcast channel includes the step of monitoring an information element field.

7. The method of claim 6 wherein the Information Element (IE) field is found in the assignment command message sent from the Base Station Controller (BSC) to the transceiver.

8. The method of claim 1 wherein the parameter is Common Gateway Identifier (CGI).

9. The method of claim 8 further comprising associating transceivers with the same CGI.

10. The method of claim 1 further comprising the step of determining signaling channel rate based on signal allocation method.

11. The method of claim 10 wherein the signal allocation method is unconcentrated (UNCONC).

12. The method of claim 10 wherein the signal allocation method is LAPD concentrated (CONC).

13. The method of claim 10 wherein the signal allocation method is 16 kB Mulitplex (MPLEX16).

14. The method of claim 10 wherein the signal allocation method is 32 kB Multiplex (MPLEX32).

15. The method of claim 1 wherein the communication link is a T span.

16. The method of claim 15 wherein the T span is a T1 line.

17. The method of claim 15 wherein the T span is a T3 line.

18. In a communication network having a base transceiver station and a base station controller operably connected by a communication link with a plurality of channels, a method for obtaining communication channel assignment without cooperation from the communication system comprising the steps of monitoring the communication link for signaling channels and mapping communication channels with information obtained from the signaling channels;
   selecting channels from the plurality of channels in the communication link used for Abis signaling and forming a set of selected channels;
   monitoring the set of selected channels to detect a known subset of base transceiver stations and associating the set of selected channels with the subset of base transceiver stations; and,
   monitoring the associated channels for each base transceiver stations in the subset for broadcast channel values associated with each base transceiver station.

19. The method of claim 18 wherein the communication link is a T span.

20. The method of claim 19 where T span is T1 or T3.

21. The method of claim 18 wherein the step of selecting channels comprises the step of monitoring all the channels for valid Link Access Protocol-D (LAPD) messages.

22. The method of claim 21 wherein the step of monitoring the channels comprises the step of detecting a predetermined number of consecutive LAPD messages in a predetermined time period.

23. The method of claim 18 wherein the step of monitoring the set of selected channels comprises the step of: determining which channels have constant values in predetermined fields over a second predetermined period of time.

24. The method of claim 23 wherein one of the predetermined fields is a network entity identification field.

25. The method of claim 18 wherein the step of monitoring the set of selected channels comprises the step of: determining which channels have a constant value in a predetermined field and another field having a predetermined number of values over a second predetermined period of time.

26. The method of claim 25 wherein the another field is a transceiver identification field.

27. The method of claim 18 wherein the communication link is an Optical Carrier-3 (OC-3) line.

28. A method of acquiring channel assignments by monitoring signaling channels between network entities connected by a communication link comprising the steps of:
   selecting communication channels in the communication link used for Abis signaling and forming a set of selected channels;
   monitoring the set of selected channels to detect a known subset of network entities;
   associating the set of selected channels with the subset of network entities; and,
   monitoring the associated channels for each network entity for broadcast channel values associated with each network entity.

29. The method of claim 28 wherein the step of selecting communication channels comprises the step of monitoring all the channels for valid Link Access Protocol-D (LAPD) messages.

30. The method of claim 29 wherein the step of monitoring the communication channels comprises the step of detecting a predetermined number of consecutive LAPD messages in a predetermined time period on the communication channels.

31. The method of claim 28 wherein the set of monitoring the set of selected channels comprises the step of: determining which channels have constant values in predetermined fields over a second predetermined period of time.

32. The method of claim 31 wherein one of the predetermined fields is a network entity identification field.

33. The method of claim 28 wherein the step of monitoring the set of selected channels comprises the step of: determining which channels have a constant value in a predetermined field and another field having a predetermined number of values over a second predetermined period of time.

34. The method of claim 33 wherein the another field is a network entity identification field.

35. The method of claim 28 wherein the step of determining channel data rate is based on signal allocation method.

36. The method of claim 35 wherein the signal allocation method is unconcentrated (UNCONC).

37. The method of claim 35 wherein the signal allocation method is concentrated (CONC).

38. The method of claim 35 wherein the signal allocation method is 16 kB Multiplex (MPLEX16).

39. The method of claim 35 wherein the signal allocation method is 32 kB Multiplex (MPLEX32).

40. The method of claim 28 wherein the communication link is a T span.

41. The method of claim 40 wherein the T span is a T1 line.

42. The method of claim 40 wherein the T span is a T3 line.

43. The method of claim 28 wherein the communication link is a Optical Carrier (OC) line.

44. The method of claim 43 wherein the OC line is a OC-3.

45. The method of claim 28 further comprising the set of determining channel data rate.

* * * * *